(12) United States Patent
Chen et al.

(10) Patent No.: US 9,417,878 B2
(45) Date of Patent: Aug. 16, 2016

(54) INSTRUCTION SCHEDULING FOR REDUCING REGISTER USAGE BASED ON DEPENDENCE DEPTH AND PRESENCE OF SEQUENCING EDGE IN DATA DEPENDENCE GRAPH

(75) Inventors: Gang Chen, Southborough, MA (US); Srinivasa B. Yadavalli, Acton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 665 days.

(21) Appl. No.: 13/435,456

(22) Filed: Mar. 30, 2012

(65) Prior Publication Data

US 2013/0262832 A1   Oct. 3, 2013

(51) Int. Cl.
  *G06F 9/30* (2006.01)
  *G06F 9/38* (2006.01)
  *G06F 9/45* (2006.01)

(52) U.S. Cl.
  CPC .............. *G06F 9/3836* (2013.01); *G06F 8/433* (2013.01); *G06F 8/445* (2013.01); *G06F 9/3838* (2013.01)

(58) Field of Classification Search
  CPC ..... G06F 9/3836; G06F 9/3838; G06F 8/433; G06F 8/441
  USPC ..................................... 712/216, E9.049, 214
  See application file for complete search history.

(56) References Cited

U.S. PATENT DOCUMENTS

| 5,784,066 | A  | * | 7/1998 | Aizikowitz et al. | ........... 345/440 |
| 7,007,271 | B2 | * | 2/2006 | Kumar et al. | ................. 717/151 |
| 8,806,460 | B2 | * | 8/2014 | Vick | .............................. 717/148 |
| 2006/0048123 | A1 | * | 3/2006 | Martin | .................. G06F 8/4452 717/160 |
| 2006/0225061 | A1 | * | 10/2006 | Ludwig et al. | ................ 717/161 |

OTHER PUBLICATIONS

R. Govindarajan et al., "Minimum Register Instruction Sequencing to Reduce Register Spills in Out-of-Order Issue Superscalar Architectures," IEEE Transactoins on Computers, vol. 52, No. 1, p. 4, Jan. 2003.

Andrew W. Appel and Kenneth J. Supowit, "Generalizations of the Sethi-Ullman Algorithm for Register Allocation", Dept. of Computer Science, Princeton University, Mar. 1986.

R. Sethi and J.D. Ullman, "The Generation of Optimal Code for Arithmetic Expressions," J. Assoc. Computing Machinery, vol 17, No. 4, p. 715, Oct. 1970.

* cited by examiner

*Primary Examiner* — Kenneth Kim
(74) *Attorney, Agent, or Firm* — Volpe and Koenig, P.C.

(57) ABSTRACT

A method, computer program product, and system are provided for scheduling a plurality of instructions in a computing system. For example, the method can generate a plurality of instruction lineages, in which the plurality of instruction lineages is assigned to one or more registers. Each of the plurality of instruction lineages has at least one node representative of an instruction from the plurality of instructions. The method can also determine a node order based on respective priority values associated with each of the nodes. Further, the method can include scheduling the plurality of instructions based on the node order and the one or more registers assigned to the one or more registers.

18 Claims, 7 Drawing Sheets

INSTRUCTION SCHEDULING FOR REDUCING REGISTER USAGE BASED ON DEPENDENCE DEPTH AND PRESENCE OF SEQUENCING EDGE IN DATA DEPENDENCE GRAPH

BACKGROUND

1. Field

Embodiments of the present invention generally relate to register instruction scheduling in order to reduce the overall register usage in a computing system. For instance, embodiments of the present invention can be used to reduce the overall register usage in a compiler-generated executable of a computing system.

2. Background

Computing applications, such as graphics applications, typically employ millions of data-parallel instructions. Oftentimes, the performance of a computing system (e.g., graphics processing unit or central processing unit) is determined by how many instructions can be executed simultaneously, in which the performance can be limited by various hardware resources associated with the computing system. One such hardware resource is the number of registers.

The computing system oftentimes includes a scheduler to manage the usage of its registers. In particular, the scheduler can manage the registers as a pool, where each incoming instruction into the computing system is allocated to one or more registers until the pool of registers is full. Consequently, an overflow of instructions cannot be allocated to a register until another instruction is completed. As computing applications continually evolve and become increasingly complex, thus increasing the number of data-parallel instructions associated with the application, the allocation of instructions to registers and associated compute time related to register allocation adversely affects the performance of the computing system.

SUMMARY

Therefore, improvements are needed to reduce the usage of registers during instruction scheduling for computing systems.

An embodiment of the present invention includes a method for scheduling a plurality of instructions in a computing system. The method can include the following: forming a plurality of instruction lineages, each of the plurality of instruction lineages having at least one node representative of an instruction from the plurality of instructions; sorting the nodes from the plurality of instruction lineages based on a priority value associated with each of the nodes to generate a node order, the priority value for each of the nodes being based on a data dependence depth value and a sequencing depth value for each of the nodes; and, scheduling the plurality of instructions based on the node order and an assignment of one or more registers to the plurality of instruction lineages.

Another embodiment of the present invention additionally includes a computer program product that includes a computer-usable medium having computer program logic recorded thereon for enabling a processor to schedule a plurality of instructions in a computing system. The computer program logic can include the following: first computer readable program code that enables a processor to form a plurality of instruction lineages, each of the plurality of instruction lineages having at least one node representative of an instruction from the plurality of instructions; second computer readable program code that enables a processor to sort the nodes from the plurality of instruction lineages based on a priority value associated with each of the nodes to generate a node order, the priority value for each of the nodes being based on a data dependence depth value and a sequencing depth value for each of the nodes; and, third computer readable program code that enables a processor to schedule the plurality of instructions based on the node order and an assignment of one or more registers to the plurality of instruction lineages.

A further embodiment of the present invention also includes a system. The system can include a data bus and a computing system. The computing system can include a scheduler configured to receive a plurality instructions from the data bus. The system can also include another computing system configured to transfer the plurality of instructions to the computing system via the data bus. Further, the computing system can be, for example, a graphics processing unit and the another computing system can be, for example, a central processing unit. The scheduler can be configured to: form a plurality of instruction lineages, each of the plurality of instruction lineages having at least one node representative of an instruction from the plurality of instructions; sort the nodes from the plurality of instruction lineages based on a priority value associated with each of the nodes to generate a node order, the priority value for each of the nodes being based on a data dependence depth value and a sequencing depth value for each of the nodes; and, schedule the plurality of instructions based on the node order and an assignment of one or more registers to the plurality of instruction lineages Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

DETAILED DESCRIPTION OF PREFERRED EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the scope of the invention. Rather, the scope of the invention is defined by the appended claims.

It would be apparent to a person of ordinary skill in the art that the present invention, as described below, can be implemented in many different embodiments of software, hardware, firmware, and/or the entities illustrated in the figures. Thus, the operational behavior of embodiments of the present invention will be described with the understanding that modifications and variations of the embodiments are possible, given the level of detail presented herein.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Before describing such embodiments in more detail, however, it is instructive to present an example environment in which embodiments of the present invention may be implemented.

Figure 1:
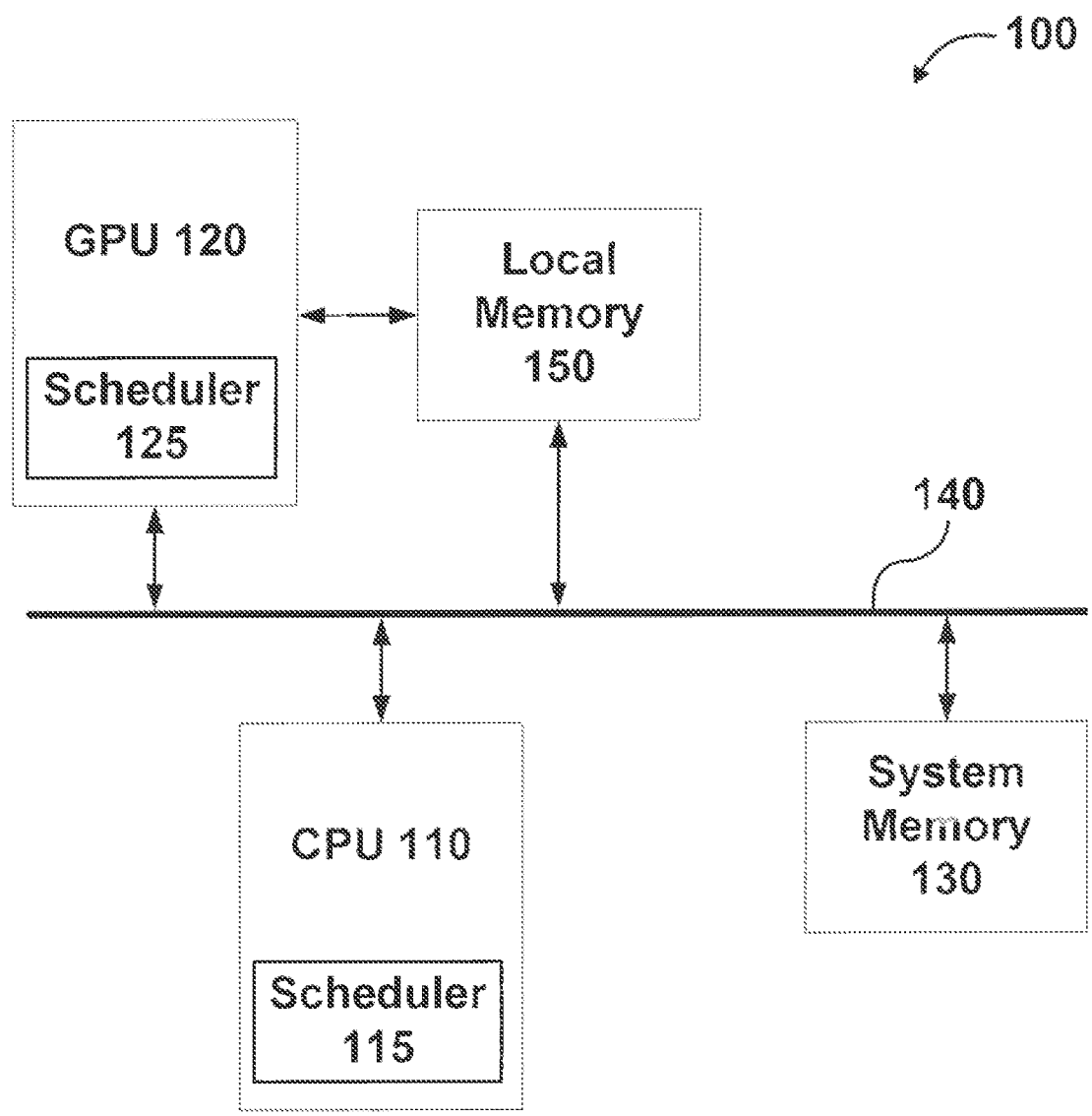
FIG. 1 is an illustration of an example computer system, in which embodiments of the present invention, or portions thereof, can be implemented.

FIG. 1 is a block diagram of an example multi-processor computer system 100, in which embodiments of the present invention, or portions thereof, can be implemented. Computer system 100 includes a central processing unit (CPU) 110 and a graphics processing unit (GPU) 120. In addition, computer system 100 includes a system memory 130 that may be accessed by CPU 110 and GPU 120. GPU 120 communicates with CPU 110 and system memory 130 over a data bus 140. Data bus 140 may be any type of bus used in computer systems, including, for example but not limited to, a peripheral component interface (PCI) bus, an accelerated graphics port (AGP) bus, and a PCI Express (PCIE) bus. GPU 120 can assist CPU 110 to perform certain special functions, in which GPU 120 can perform the special functions faster than CPU 110. These certain special functions can include, for example but not limited to, graphics-related instructions.

Computer system 100 also includes a local memory 150. Local memory 150 is coupled to GPU 120 and to data bus 140. Local memory 150 is available to GPU 120 to provide faster access to certain data (e.g., frequently-used data by GPU 120) than would be possible if the data were stored in system memory 130.

CPU 110 and GPU 120 can be configured to decode and execute instructions. In particular, CPU 110 and GPU 120 include a scheduler 115 and a scheduler 125, respectively. Schedulers 115 and 125 provide an order of execution for incoming instructions and allocate registers for use by the incoming instructions for CPU 110 and GPU 120, respectively. In an embodiment, scheduler 125 of GPU 120 can receive graphics-related instructions from CPU 110 and provide a sequence of instructions for the registers of GPU 120 (the process of providing the sequence of instructions is also referred to herein as "scheduling"). Oftentimes, computing systems (e.g., computer system 100; or, alternatively, CPU 110, GPU 120, or other components of computer system 100 which may individually or in various combinations, in alternative embodiments embody aspects of the present invention) do not contain enough registers to hold the values needed to fully execute a set of instructions and any functions that may be called. Embodiments of the present invention address this issue and provide a method, computer program product, and system to reduce the usage of registers during instruction scheduling for computing systems, as will be described in further detail below.

Figure 2:
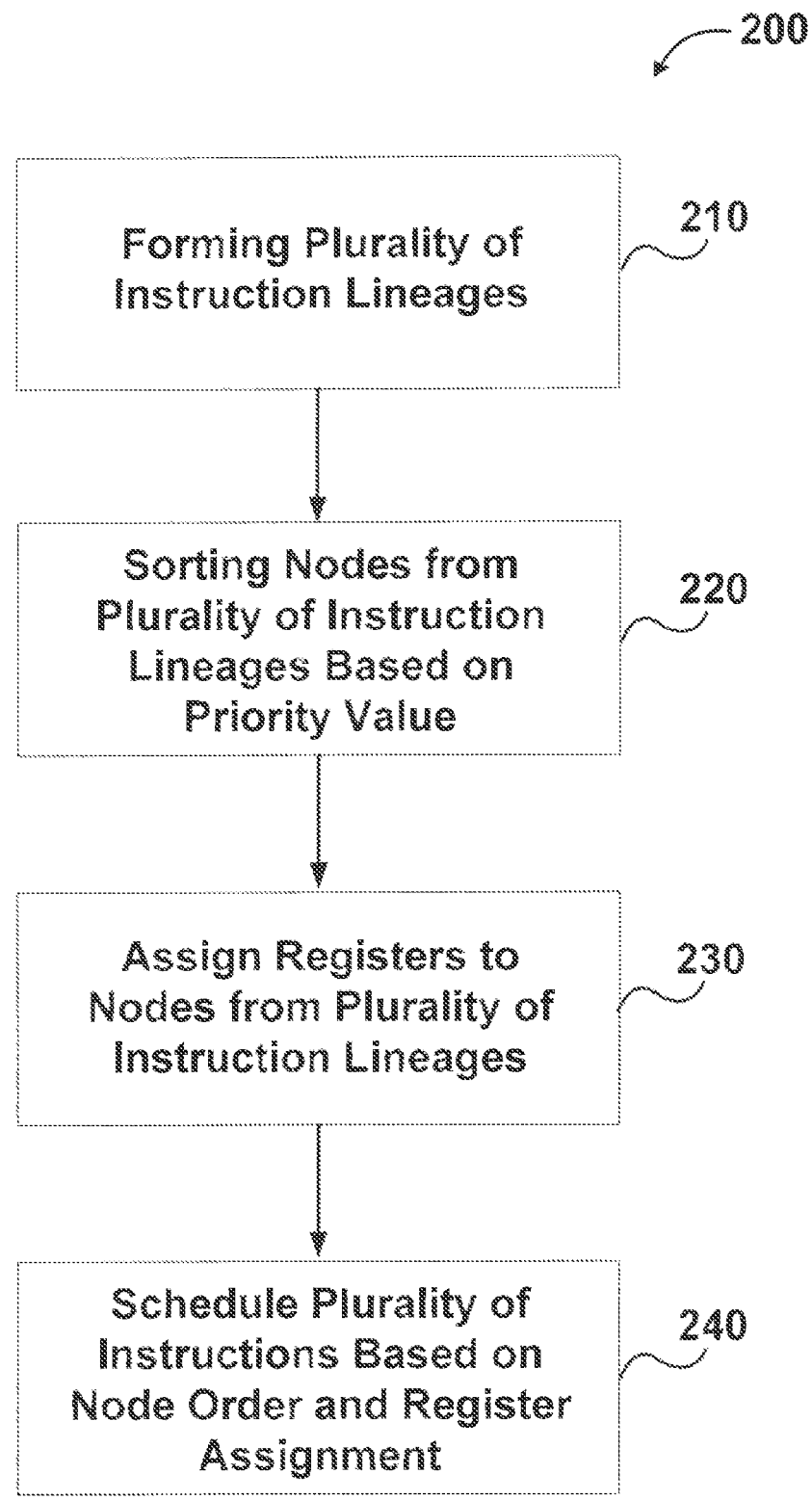
FIG. 2 is an illustration of an embodiment of a method for scheduling a plurality of instructions in a computing system.

FIG. 2 is an illustration of an embodiment of a method 200 for scheduling a plurality of instructions in a computing system. CPU 110 and/or GPU 120 of FIG. 1 can be used, for example, to perform the steps of method 200. In particular, schedulers 115 and 125 of CPU 110 and GPU 120, respectively, can be used to perform the steps of method 200. It is to be appreciated that method 200 may not use all of the steps shown, nor be performed in the order shown, in different applications.

In one example, method 200 provides a heuristic approach to scheduling instructions in a computing system such that the number of registers allocated to the instructions is reduced (e.g., a minimum number of registers is allocated to the instructions). As described in detail below, method 200 includes the following steps: step 210: forming a plurality of instruction lineages; step 220: sorting nodes from the plurality of instruction lineages based on a priority value; step 230: assigning registers to nodes based on the plurality of instruction lineages; and, step 240: scheduling a plurality of instructions based on node order and register assignment.

Figure 3A:
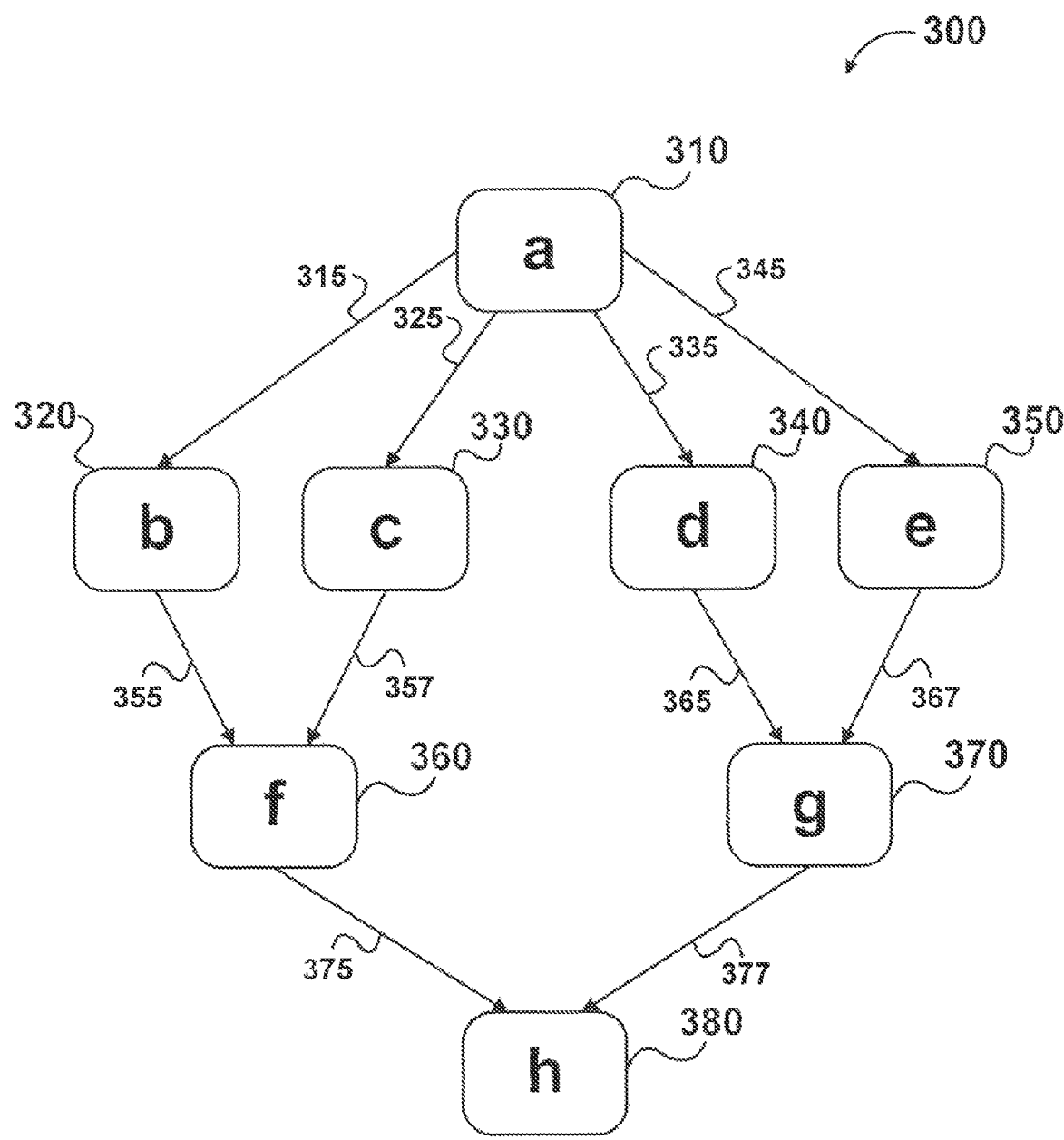
FIG. 3(a) is an illustration of an exemplary data dependence graph.

In an example operation, a starting point for method 200 is generation or access of a data dependence graph that illustrates dependencies of one or more instructions towards each other. For explanation and exemplary purposes, FIG. 3 is an illustration of an example data dependence graph 300 with 8 nodes (i.e., nodes 310-380). As can be appreciated, alternative node arrangements are also contemplated within the scope of the present invention that include more or less nodes. Each of nodes 310-380 represents an instruction to be scheduled by a computing system. For explanation and exemplary purposes, the instructions associated with nodes 310-380 are as follows:

a: s1=Id(x);
    b: s2=s1+4;
    c: s3=s1*8;
    d: s4=s1−4;
    e: s5=s1/2;
    f: s6=s2*s3;
    g: s7=s4*s5; and,
    h: s8=s6*s7.

Id(x) represents an equation that is a function of a variable 'x', where variable s1 is equal to Id(x). Variables s1-s8 have dependencies toward each other, where arrows 315, 325, 335, 345, 355, 357, 365, 367, 375, and 377 represent the data dependencies in data dependence graph 300. These data dependencies are also referred to herein as "data dependence edges." Additional information on example data dependence graphs can be found in Govindarajan et al., "Minimum Register Instruction Sequencing to Reduce Register Spills in Out-of-Order Issue Superscalar Architectures," IEEE Transactions on Computers, vol. 52, no. 1, pp. 4-20 (January 2003) (hereinafter "Govindarajan Article"), which is incorporated by reference herein in its entirety.

Turning back to FIG. 2, in step 210 a plurality of instruction lineages is formed. In one example, each of the instruction lineages has at least one node (e.g., one of nodes 310-380 of FIG. 3) that is representative of an instruction from the plurality of instructions. An instruction lineage can be defined as follows: if there is a schedule of instructions in a data dependence graph $S_1, S_2, \ldots, S_n$, where $S_2$ is the descendant of $S_1$, $S_3$ is the descendant of $S_2$, etc., then a lineage of these instructions can be formed in such a way that all of the instructions in the lineage share the same register. That is, the register assigned to $S_1$ is passed on to $S_2$ ($S_1$'s heir), which is passed onto $S_3$, and so on.

In the example that $S_1$ has more than one descendant, in order for $S_2$ to use the same register as $S_1$, the other descendants of $S_1$ are scheduled before $S_2$. Thus, the selection of one of the descendants of $S_1$ to the heir of the register creates scheduling constraints among the descendants of $S_1$. These scheduling constraints are referred to herein as "sequencing edges."

Figure 3B:
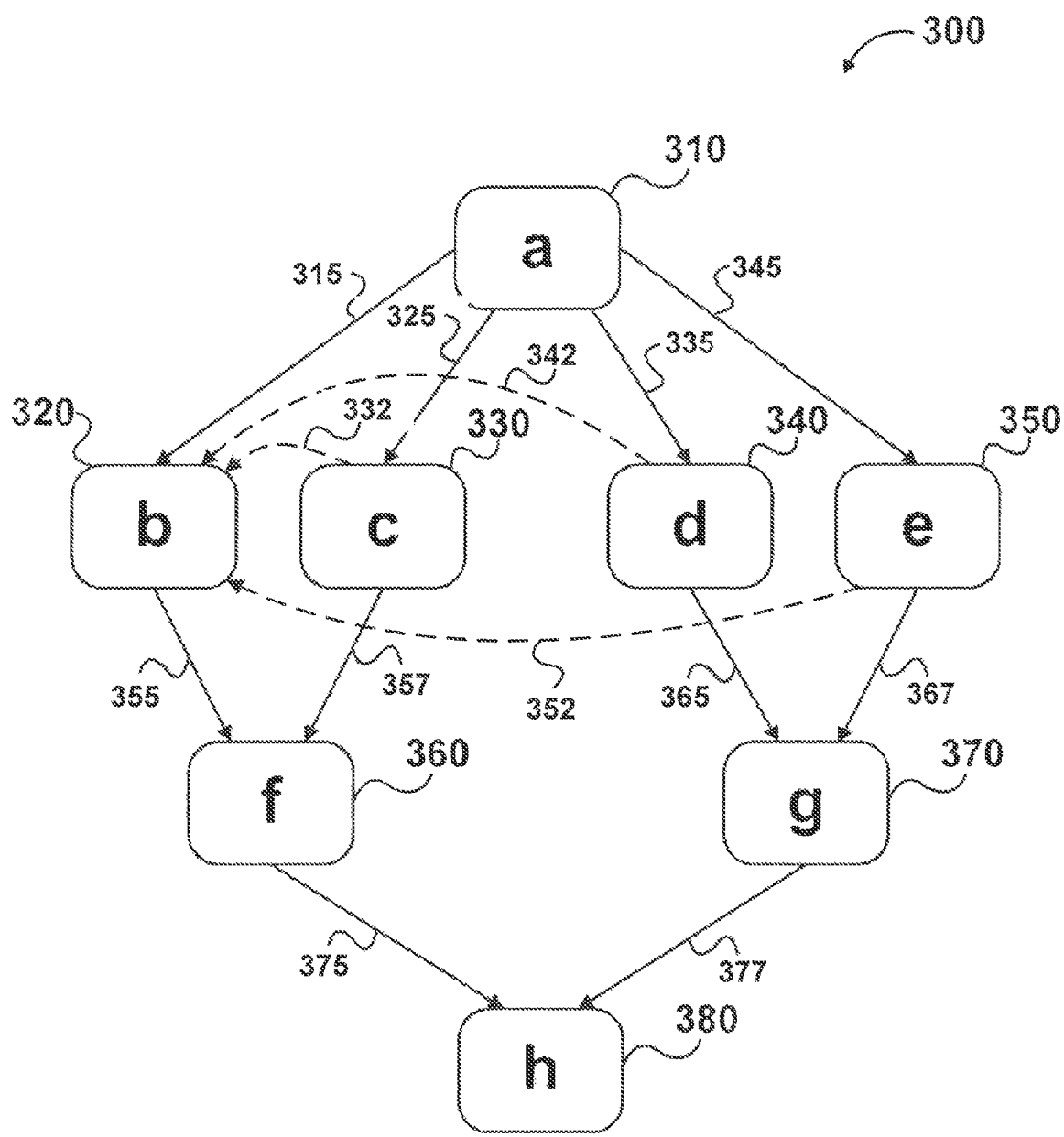
FIG. 3(b) is an illustration of an exemplary data dependence graph with sequencing edges.

FIG. 3(b) is an illustration of an example data dependence graph with sequencing edges represented as dotted arcs 332, 342, and 352. In this example, node 320 has three sequencing edges since instructions associated with nodes 330, 340, and 350 would need to be scheduled before the instruction associated with node 320.

In this example, based on the data dependence graph with sequencing edges, the plurality of instruction lineages for step 210 can be defined as follows:

L1: [node 310 (a), node 320 (b), node 360 (f), node 380 (h));
L2: [node 330 (c), node 360 (f));
L3: [node 340 (d), node 370 (g), node 380 (h)); and,
L4: [node 350 (e), node 370 (g)).

For instruction lineage L1, nodes 310, 320, 360, and 380 share the same register. For instruction lineage L2, nodes 330 and 360 share the same register. For instruction lineage L3, nodes 340, 370, and 380 share the same register. For instruction lineage L4, nodes 350 and 370 share the same register. Additional information on an exemplary formation of instruction lineages can be found in the Govindarajan Article.

Returning again to FIG. 2, in step 220 the nodes from the plurality of instruction lineages are sorted based on a priority value associated with each of the nodes. In an embodiment, the priority value for each of the nodes is based on a data dependence depth value and a sequencing depth value for each of the nodes.

Figure 4:
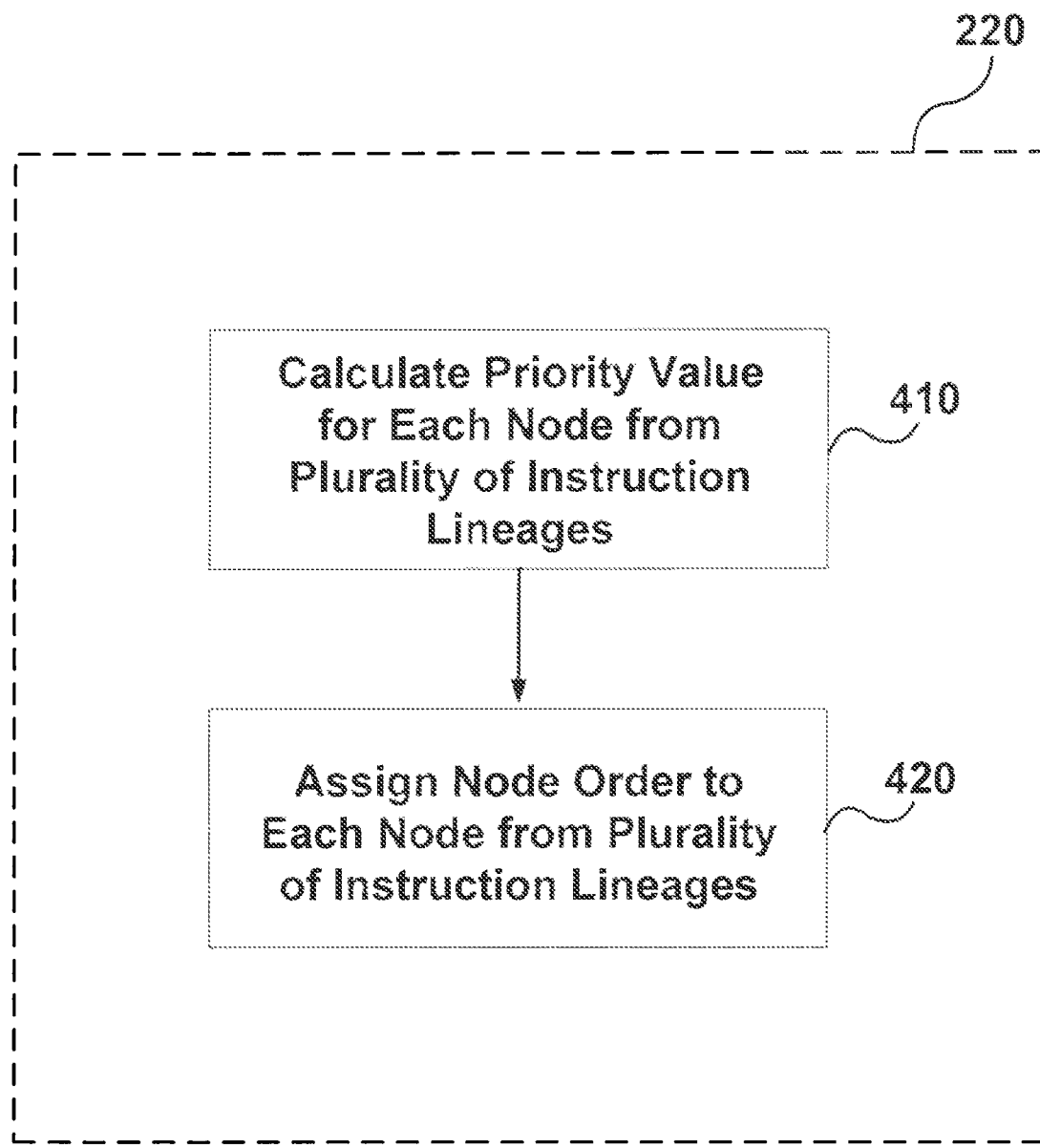
FIG. 4 is an illustration of an embodiment of a method for sorting nodes from a plurality of instruction lineages.

FIG. 4 illustrates an embodiment in which step 220 can be divided into two steps (steps 410 and 420).

In step 410, a priority value is calculated for each of the nodes from the plurality of instruction lineages. In an embodiment, the priority value for each node is calculated by adding a data dependence depth value to a sequencing depth value for the respective node. In one example, a data dependence depth value refers to the number of data dependence edges associated with a particular node. In one example, a sequencing depth value refers to the presence of a sequencing edge for a node.

In an embodiment, if a node has a sequencing edge or is associated with a node that has a sequencing edge in the same instruction lineage, then the sequencing depth value for that node is a '1'. Otherwise, if the node does not have a sequencing edge or is not associated with a node that has a sequencing edge in the same instruction lineage, then the sequencing depth value for that node is a '0', according to an embodiment of the present invention.

In an embodiment, step 410 can be performed using a "top-down" approach, where priority values for nodes at the top of a data dependence graph (e.g., node 310 of FIG. 3) are calculated first, followed by nodes at the next lower level of the data dependence graph (e.g., nodes 320-350), followed by nodes at the next lower level of the data dependence graph (e.g., nodes 360 and 370), and so forth. In other words, step 410 starts with a node in a data dependence graph that does not have a predecessor (e.g., node 310) and then analyzes the nodes at the next lower level of the data dependence graph.

For example, in reference to data dependence graph 300 of FIG. 3, node 310 has a data dependence depth value of '0' and a sequencing depth value of '0', and as a result, the priority value for node 310 is '0' (i.e., priority value=data dependence depth value+sequencing depth value=0+0=0). Node 320 has a data dependence depth value of '1' and a sequencing depth value of '1', and as a result, the priority value for node 320 is '2'. Node 360 has a data dependence depth value of '2' and a sequencing depth value of '1', and as a result, the priority value for node 360 is '3' Since node 360 is associated with node 320 and is in the same instruction lineage as node 320 (e.g., L1), node 360 also has a sequencing depth value of '1'. On the other hand, since this portion of step 220 analyzes data dependence graph 300 using the "top-down" approach, node 310 does not have a sequencing depth value of '1' although it is in the same instruction lineage as node 320. Rather, those nodes that follow node 320 in data dependence graph 300 (based on the "top-down" approach) and are in the same instruction lineage as node 320 (e.g., L1) will have a sequencing depth value of '1'. For example, Table 1 provides data dependence depth, sequencing depth, and priority values for nodes 310-380 of data dependence graph 300.

TABLE 1

Data Dependence Depth, Sequence Depth, and Priority Values for Nodes 310-380 of Data Dependence Graph 300

| Node | Data Dependence Depth Value | Sequencing Depth Value | Priority Value |
| --- | --- | --- | --- |
| Node 310 | 0 | 0 | 0 |
| Node 320 | 1 | 1 | 2 |
| Node 330 | 1 | 0 | 1 |
| Node 340 | 1 | 0 | 1 |
| Node 350 | 1 | 0 | 1 |
| Node 360 | 2 | 1 | 3 |
| Node 370 | 2 | 0 | 2 |
| Node 380 | 3 | 1 | 4 |

In turning to step 420 of FIG. 4, a node order is assigned to each of the nodes from the plurality of instruction lineages. In an embodiment, the node order is determined by storing the instructions associated with nodes 310-380 in an instruction or execution stack based on the priority value of each of the nodes. In one example, an instruction or execution stack is a data structure that stores information about an active subroutine or set of instructions (e.g., those instructions associated with nodes 310-380) of a computer program.

In an embodiment, step 420 can be performed using a "bottom-up" approach, where nodes at the bottom of a data dependence graph (e.g., node 380) are pushed onto the instruction stack, followed by a node at the next upper level of the data dependence graph (e.g., node 360), followed by a node at the next upper level of the data dependence graph (e.g., node 320), and so forth. If there are two or more nodes at the same level of a data dependence graph (e.g., nodes 360 and 370), the node with the highest priority value will be pushed onto the stack first, according to an embodiment of the present invention. Step 420 then moves to the next upper level of the data dependence graph and evaluates the priority values of the nodes at the next upper level in a similar manner.

In an embodiment, once the top of the data dependence graph is reached and a node that is associated with the top of the data dependence graph is pushed onto the instruction stack, that same node is then popped off the instruction stack. At this point, step 420 analyzes the data dependence graph using a "top-down" approach. The "push" and "pop" of nodes from the instruction stack, as well as the "bottom-up" and "top-down" traversal of the data dependence graph, will be described in more detail below in the context of data dependence graph 300 of FIG. 3.

With reference again to FIG. 3, in reference to data dependence graph 300, using the "bottom-up" approach of step 420 (in FIG. 4), node 380 is first pushed onto the instruction stack. This is because node 380 is at the bottom of data dependence graph 300. The next upper level of data dependence graph includes nodes 360 and 370. Here, node 360 is pushed onto the instruction stack because it has a higher priority value than node 370 (see Table 1). The next upper level of data dependence graph 300 includes nodes 320, 330, 340, and 350. Here, node 320 is pushed onto the instruction stack because it has the highest priority value among the nodes at this level. The next upper level of data dependence graph 300 is the top of the graph and includes node 310. Node 310 is pushed onto the instruction stack.

Figure 5:
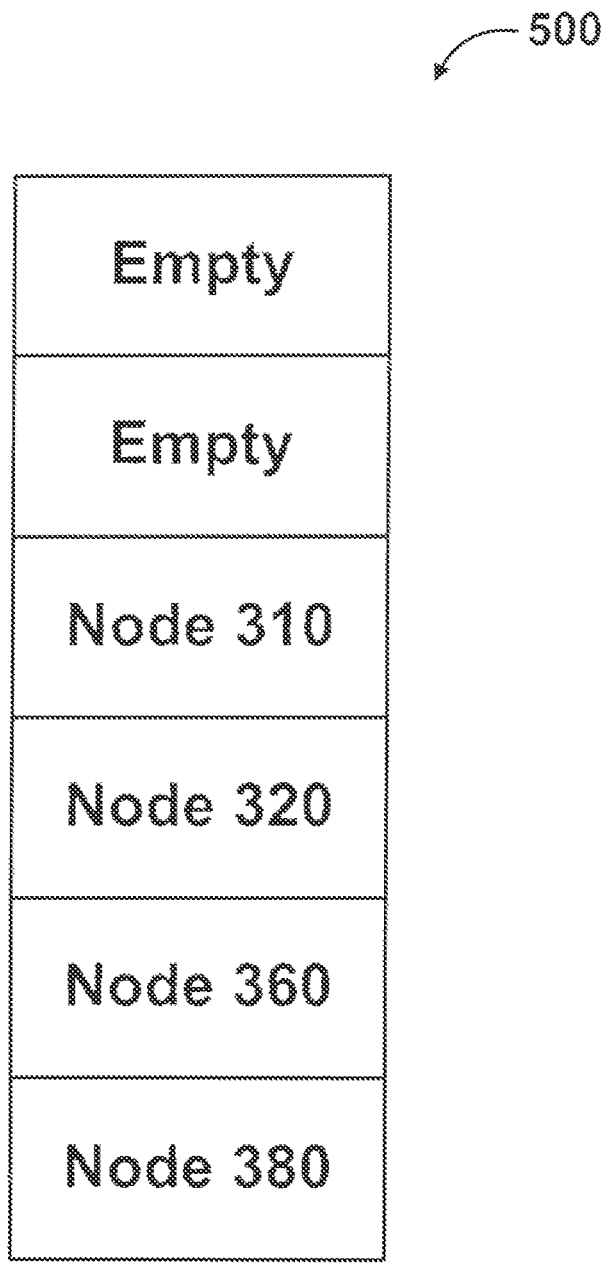
FIG. 5 is an illustration of an exemplary instruction stack.

FIG. 5 is an illustration of an exemplary instruction stack 500 at the end of the "bottom-up" approach of step 420, according to an embodiment of the present invention.

With reference to FIGS. 3, 4, and 5, with node 310 at the top of instruction stack 500, step 420 performs a "top-down" analysis of data dependence graph 300. In the "top-down" analysis, nodes are pushed onto and popped off the instruction stack at each level of data dependence graph 300 based on the priority value associated with each of the nodes (e.g., see Table 1), according to an embodiment of the present invention.

In an embodiment, at each level of the data dependence graph, the order at which a node is pushed onto and popped off the instruction stack is based on the priority value associated with each of the nodes. The node with the lowest priority value will be pushed onto and popped off onto the instruction stack first, followed by the node with the next lowest priority value, and so forth.

For example, starting with node 310 at the top of data dependence graph 300, node 310 is popped off the instruction stack. At the next lower level of data dependence graph 300, nodes 330, 340, and 350 are each pushed onto and popped off the instruction stack (note that node 320 has already been pushed onto the instruction stack). Since nodes 330, 340, and 350 have the same priority value, there is no particular order at which these nodes are pushed onto and popped off the instruction stack. For instance, node 330 is pushed onto the instruction stack and then popped off the instruction stack, followed by node 340 being pushed onto the instruction stack and then popped off the instruction stack, and then followed by node 350 being pushed onto the instruction stack and then popped off the instruction stack. At this point, node 320 is at the top of instruction stack 500 of FIG. 5. Node 320 (which also has the highest priority value at this level of data dependence graph 300) is then popped off the instruction stack.

In this example, the next lower level of data dependence graph 300 includes nodes 360 and 370, in which node 360 is at the top of instruction stack 500. Next, since node 370 has a lower priority value than node 360, node 370 is pushed onto and popped off the instruction stack. Next, node 360 is popped off instruction stack 500. Finally, node 380 (which is at the bottom of instruction stack 500) is popped off instruction stack 500.

In summary, in this example, the "top-down" analysis of step 420 results in the following node order (or instruction schedule) from beginning to end:

Node Order={Node 310, Node 330, Node 340, Node 350, Node 320, Node 370, Node 360, Node 380}

The above node order (or instruction schedule) resulting from step 220 of FIG. 2 takes into account a priority value (based on a data dependence depth value and a sequencing depth value) for each of the nodes in the data dependence graph.

With reference again to FIG. 2, examples of steps 230 and 240 will now be described. In step 230, the plurality of instruction lineages is assigned to one or more registers. This can also be referred to as "coloring" instruction lineages. Coloring can be used as a guideline (or starting point) to generate an instruction schedule that uses a minimum number of registers, as would be understood by a person of ordinary skill in the art, where one or more instruction lineages can be assigned to a common register.

In reference to instruction lineages L1-L4 (defined above), L1-L4 can be colored using three colors because only three of the nodes in data dependence graph 300 are live simultaneously. For example, L1 can receive red, L2 can receive green, L3 receive blue, and L4 can receive green. Here, L2 and L4 can receive the same color because these instruction lineages can be scheduled such that they are not active simultaneously. Additional information on coloring techniques can be found in the Govindarajan Article.

In step 240, the plurality of instructions is scheduled based on the node order (from step 220) and the assignment of the plurality of instruction lineages to the one or more registers (from step 230). In an embodiment, the node order can be modified based on the assignment of the plurality of instruction lineages to the one or more registers. That is, if a first node from a first instruction lineage shares a common register with a second node from a second instruction lineage, and if the first node is prior to the second node in the node order, then the scheduling of the instruction associated with the second node can be delayed until the instruction associated with the first node is finished with the common register, according to an embodiment of the present invention. However, if the second node cannot be delayed due other scheduling constraints, then the number of registers assigned to the plurality of instruction lineages can be modified in order to avoid the scheduling constraint, according to an embodiment of the present invention.

For example, in reference to the example discussed above and FIGS. 2 and 3, the starting point for the scheduling of the plurality of instructions is the node order from step 220 (repeated here for ease of reference):

Node Order={Node 310, Node 330, Node 340, Node 350, Node 320, Node 370, Node 360, Node 380}

Here, the instruction associated with node 310 will be scheduled first. Next, the instruction associated with node 330 will be scheduled and then followed by the instruction associated with node 340. At this point, the instruction associated with node 310 belongs to instruction lineage L1, which is colored red (from step 230). The instruction associated with node 330 belongs to instruction lineage L2, which is colored green (from step 230). Further, the instruction associated with node 340 belongs to instruction lineage L3, which is colored blue (from step 230). Based on the colors of these instruction lineages, the instructions associated with nodes 310, 330, and 340 are each assigned to a particular register and, as such, there is no conflict in register usage when scheduling the instructions associated with these nodes in the schedule provided by the node order above.

The next node in the node order is node 350. The instruction associated with node 350 belongs to instruction lineage L4, which is colored green (from step 230). Since instructions associated with instruction lineages L2 and L4 share a common register (e.g., both instruction lineages L2 and L4 are colored green) and the instruction associated with node 330 is currently allocated to the common register, another register is assigned to node 350 in order to avoid a scheduling constraint. That is, since node 350 has a sequencing edge with node 320, node 350 must be scheduled before node 320 can be scheduled. Further, since node 360 cannot be scheduled before node 320 and node 370 cannot be scheduled before node 350 due to their respective data dependence edges, another register is assigned to node 350 in order to avoid the scheduling constraint. This is an example of where the number of registers assigned to the plurality of instruction lineages is modified due to a scheduling constraint.

The next node in the node order is node 320. The instruction associated with node 320 belongs to instruction lineage L1. The next node in the node order is node 370, in which the instruction associated with node 370 is scheduled next. Next, the instruction associated with node 360 is scheduled, followed by the instruction associated with node 380.

In summary, for the example discussed, a top-down listing of the scheduling of instructions from step 240 is as follows:
Schedule node 310 based on the node order (from step 220);
Schedule node 330 based on the node order;
Schedule node 340 based on the node order;
Assign a new register to node 350 in order to avoid scheduling constraint;
Schedule node 350;
Schedule node 320;
Schedule node 370;
Schedule node 360; and,
Schedule node 380.
Therefore, the node order from step 240 is the same as the node order from step 220.

In an embodiment, the node order from step 240 can differ from the node order from step 220. For instance, if a first node from a first instruction lineage shares a common register with a second node from a second instruction lineage, and if the first node is prior to the second node in the node order, then the scheduling of the instruction associated with the second node can be delayed until the instruction associated with the first node is finished with the common register. Here, if the delay in scheduling of the second node does not trigger a scheduling constraint, then the node order can be modified to reflect the delay in scheduling of the second node until the common register becomes available.

In one example, method 200 provides a heuristic approach to scheduling a plurality of instructions in a computing system (e.g., CPU 110 and GPU 120 of FIG. 1) such that the number of registers allocated to the instructions is reduced (e.g., a minimum number of registers is allocated to the instructions). For example, method 200 sorts nodes from a plurality of instruction lineages based on a priority value associated with each of the nodes, where the priority value for each of the nodes is based on a data dependence depth value and a sequencing depth value for each of the nodes. The scheduling of the plurality instructions can be based on the priority values for each of the nodes and one or more registers assigned to the plurality of instruction lineages.

In various examples, method 200 can be used to schedule, for example but not limited to, graphics-related instructions that can have, for example, hundreds, thousands, or millions of instructions related to a graphics function. Based on the description herein, a person of ordinary skill in the art will recognize that method 200 is not limited to graphics applications and can be applied to computing systems that schedule instructions related to non-graphics applications.

Figure 6:
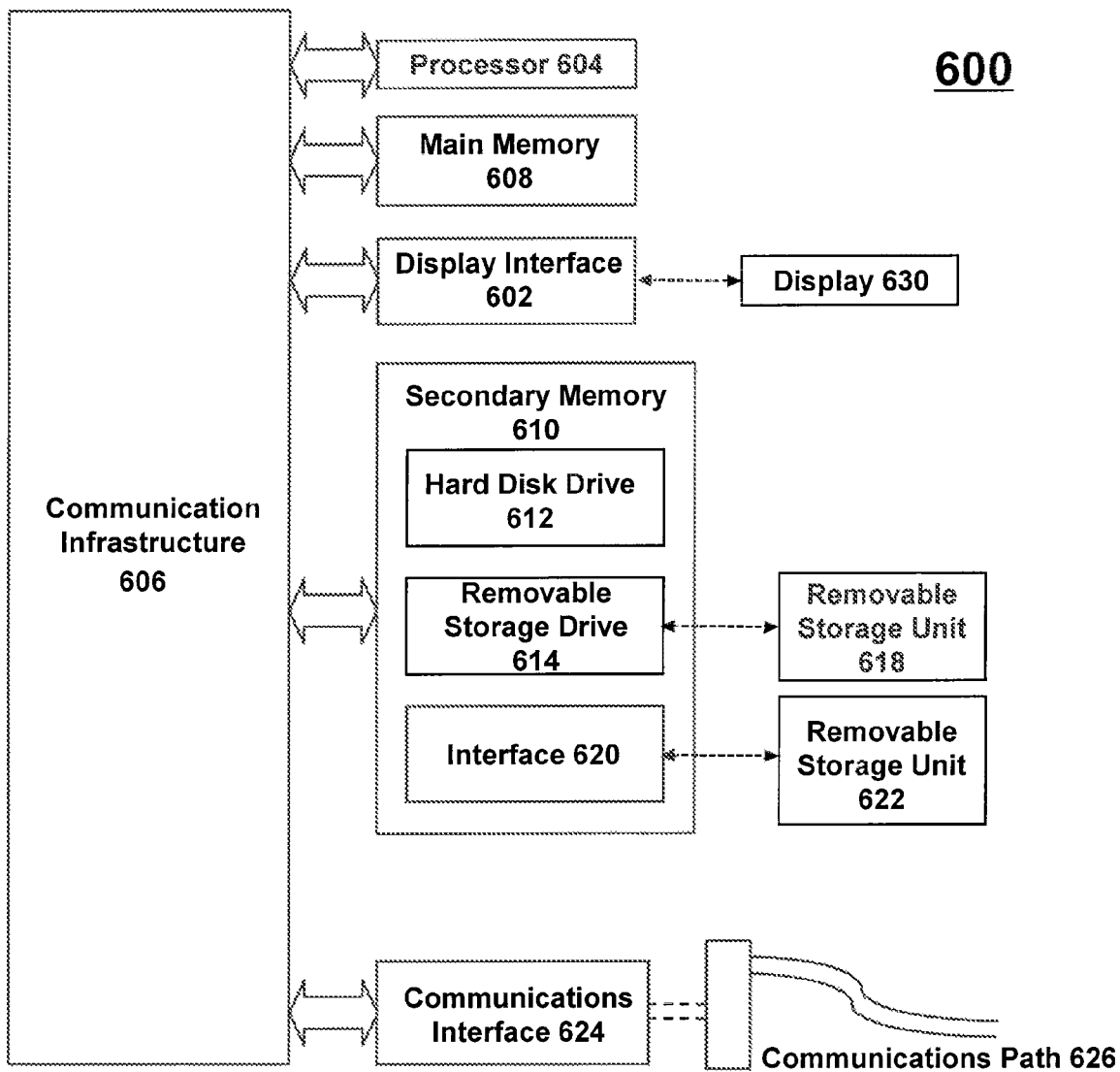
FIG. 6 is an illustration of an example computer system in which embodiments of the present invention, or portions thereof, can be implemented as computer readable code.

Various aspects of the present invention may be implemented in software, firmware, hardware, or a combination thereof. FIG. 6 is an illustration of an example computer system 600 in which embodiments of the present invention, or portions thereof, can be implemented as computer-readable code. For example, the method illustrated by flowchart 200 of FIG. 2 can be implemented in system 600. Various embodiments of the present invention are described in terms of this example computer system 600. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (e.g., a GPU core) that is embodied in program code and can be transformed to hardware as part of the production of integrated circuits.

Computer system 600 includes one or more processors, such as processor 604. Processor 604 may be a special purpose or a general-purpose processor such as, for example, GPU 120 or CPU 110 of FIG. 1, respectively. Processor 604 is connected to a communication infrastructure 606 (e.g., a bus or network).

Computer system 600 also includes a main memory 1608, preferably random access memory (RAM), and may also include a secondary memory 610. Secondary memory 610 can include, for example, a hard disk drive 612, a removable storage drive 614, and/or a memory stick. Removable storage drive 614 can include a floppy disk drive, a magnetic tape drive, an optical disk drive, a flash memory, or the like. The removable storage drive 614 reads from and/or writes to a removable storage unit 618 in a well-known manner. Removable storage unit 618 can comprise a floppy disk, magnetic tape, optical disk, etc. which is read by and written to by removable storage drive 614. As will be appreciated by persons skilled in the relevant art, removable storage unit 618 includes a computer-usable storage medium having stored therein computer software and/or data.

In alternative implementations, secondary memory 610 can include other similar devices for allowing computer programs or other instructions to be loaded into computer system 600. Such devices can include, for example, a removable storage unit 622 and an interface 620. Examples of such devices can include a program cartridge and cartridge interface (such as those found in video game devices), a removable memory chip (e.g., EPROM or PROM) and associated socket, and other removable storage units 622 and interfaces 620 which allow software and data to be transferred from the removable storage unit 622 to computer system 600.

Computer system 600 can also include a communications interface 624. Communications interface 624 allows software and data to be transferred between computer system 600 and external devices. Communications interface 624 can include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 618, removable storage unit 622, and a hard disk installed in hard disk drive 612. Computer program medium and computer-usable medium can also refer to memories, such as main memory 608 and secondary memory 610, which can be memory semiconductors (e.g., DRAMs, etc.). These computer program products provide software to computer system 600.

Computer programs (also called computer control logic) are stored in main memory 608 and/or secondary memory 610. Computer programs may also be received via communications interface 624. Such computer programs, when executed, enable computer system 600 to implement embodiments of the present invention as discussed herein. In particular, the computer programs, when executed, enable processor 604 to implement processes of embodiments of the present invention, such as the steps in the methods illustrated by flowchart 200 of FIG. 2, discussed above. Accordingly, such computer programs represent controllers of the computer system 600. Where embodiments of the present invention are implemented using software, the software can be stored in a computer program product and loaded into computer system 600 using removable storage drive 614, interface 620, hard drive 612, or communications interface 624.

Embodiments of the present invention are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMs, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for scheduling a plurality of instructions in a computing system using a plurality of registers to temporarily store values needed to execute the plurality of instructions prior to execution of the plurality of instructions, the method comprising:

generating a data dependence graph for the plurality of instructions;

generating a plurality of instruction lineages, each of the plurality of instruction lineages comprising at least two of the plurality of instructions that share a data dependency relationship such that executing at least one of the at least two instructions requires a value provided as a result of executing another one of the at least two instructions;

assigning all of the instructions in the same instruction lineage to the same register for temporary storage prior to their execution in the computing system;

assigning a priority value to each of the plurality of instructions, the assigned priority value for each of the plurality of instructions being based at least on whether the instruction has a sequencing edge or is assigned to the same instruction lineage as an instruction that has a sequencing edge and on a data dependence depth value for the instruction, wherein a sequencing edge indicates that an instruction is required to be executed after at least one instruction in another instruction lineage and the data dependence depth value is a value that indicates a number of instructions of the plurality instructions represented in the data dependence graph that the instruction is dependent on;

determining an instruction order-based at least on the priority value assigned to each of the plurality of instructions; and scheduling each of the plurality of instructions for temporary register usage prior to their execution based at least on the assigned register and the instruction order.

2. The method of claim 1, wherein the generating comprises:

determining whether each of the plurality of instructions is a sequencing edge or is assigned to the same instruction lineage as a sequencing edge.

3. The method of claim 2, wherein the assigning further comprises:

calculating the priority value for each of the plurality of instructions by adding the data dependence depth value to a sequencing depth value for each respective one of the instructions.

4. The method of claim 2, further comprising:
pushing a first set of the plurality of instructions onto an instruction stack based on the respective priority values of each of the instructions in the first set of instructions while traversing from a bottom to a top of the data dependence graph; and
pushing and popping a second set of the plurality of instructions from the instruction stack based on the respective priority values of each of the instructions in the second set of instructions while traversing from the top to the bottom of the data dependence graph.

5. The method of claim 1, wherein the scheduling comprises assigning a common one of the registers to two or more of the plurality of instruction lineages.

6. The method of claim 1, wherein the scheduling comprises, if a first one of the instructions from a first one of the plurality of instruction lineages shares a common one of the registers with a second one of the instructions from a second one of the instruction lineages and if the first instruction is prior to the second instruction in an instruction order, delaying the scheduling of the second instruction until the second instruction is finished using the common register.

7. A computer program product comprising a computer-usable non-transitory storage medium having computer program logic recorded thereon that, when executed by one or more processors, schedules a plurality of instructions for execution in a computing system using a plurality of registers to temporarily store values needed to execute the plurality of instructions prior to execution of the plurality of instructions, the computer program logic comprising:
first computer readable program code that enables a processor to:
generate a data dependence graph for the plurality of instructions;
generate a plurality of instruction lineages, each of the plurality of instruction lineages comprising at least two of the plurality of instructions that share a data dependency relationship such that executing at least one of the at least two instructions requires a value provided as a result of executing another one of the at least two instructions, and
assign all of the instructions in the same instruction lineage to the same register for temporary storage prior to their execution in the computing system; and
second computer readable program code that enables a processor to:
assign a priority value to each of the plurality of instructions, the assigned priority value for each of the plurality of instructions being based at least on whether the instruction has a sequencing edge or is assigned to the same instruction lineage as an instruction that has a sequencing edge and on a data dependence depth value for the instruction, wherein a sequencing edge indicates that an instruction is required to be executed after at least one instruction in another instruction lineage and the data dependence depth value is a value that indicates a number of instructions of the plurality instructions represented in the data dependence graph that the instruction is dependent on,
determine an instruction order based at least on the priority value assigned to each of the plurality of instructions, and
schedule each of the plurality of instructions for temporary register usage prior to their execution based at least on the assigned register and the instruction order.

8. program product of claim 7, wherein the first computer readable program code comprises:
third computer readable program code that enables a processor to determine whether each of the plurality of instructions is a sequencing edge or is assigned to the same instruction lineage as a sequencing edge.

9. The computer program product of claim 8, wherein the second computer readable program code further enables the processor to calculate the priority value for each of the plurality of instructions by adding the data dependence depth value to a sequencing depth value for each respective one of the instructions.

10. The computer program product of claim 8, wherein the second computer readable program code comprises:
third computer readable program code that enables a processor to push a first set of the plurality of instructions onto an instruction stack based on the respective priority values of each of the instructions in the first set of instructions while traversing from a bottom to a top of the data dependence graph; and
fourth computer readable program code that enables a processor to push and pop a second set of the plurality of instructions from the instruction stack based on the respective priority values of each of the instructions in the second set of instructions while traversing from the top to the bottom of the data dependence graph.

11. The computer program product of claim 7, wherein the second computer readable program code comprises:
third computer readable program code that enables a processor to assign a common one of the registers to two or more of the plurality of instruction lineages.

12. The computer program product of claim 7, wherein the second computer readable program code comprises:
third computer readable program code that enables a processor to, if a first one of the instructions from a first one of the plurality of instruction lineages shares a common one of the registers with a second one of the instructions from a second one of the instruction lineages and if the first instruction is prior to the second instruction in an instruction order, delay the scheduling of the second instruction until the first instruction is finished using the common register.

13. A system comprising:
a data bus; and
a computing system with a scheduler, wherein the scheduler is configured to receive a plurality of instructions from the data bus and is configured to:
generate a data dependence graph for the plurality of instructions;
generate a plurality of instruction lineages, each of the plurality of instruction lineages comprising at least two of the plurality of instructions that share a data dependency relationship such that executing at least one of the at least two instructions requires a value provided as a result of executing another one of the at least two instructions;
assign all of the instructions in the same instruction lineage to the same register for temporary storage prior to their execution in the computing system;
assign a priority value to each of the plurality of instructions, the assigned priority value for each of the plurality of instructions being based at least on whether the instruction has a sequencing edge or is assigned to the same instruction lineage as an instruction that has a sequencing edge and on a data depth value for the instruction, wherein a sequencing edge indicates that an instruction is required to be executed after at least one instruction in another instruction lineage and the data depth value is a value that indicates a number of instructions of the plurality instructions represented in the data dependence graph that the instruction is dependent on;

determine an instruction order-based at least on the priority value assigned to each of the plurality of instructions; and schedule each of the plurality of instructions for temporary register usage prior to their execution based at least on the assigned register and the instruction order.

14. The system of claim 13, wherein the scheduler is further configured to:

determine whether each of the plurality of instructions is a sequencing edge or is assigned to the same instruction lineage as a sequencing edge.

15. The system of claim 14, wherein the scheduler is further configured to calculate the priority value for each of the plurality of instructions by adding the data dependence depth value to a sequencing depth value for each respective one of the instructions.

16. The system of claim 14, wherein the scheduler is further configured to:

push a first set of the plurality of instructions onto an instruction stack based on the respective priority values of each of the instructions in the first set of instructions while traversing from a bottom to a top of the data dependence graph; and push and pop a second set of the plurality of instructions from the instruction stack based on the respective priority values of each of the instructions in the second set of instructions while traversing from the top to the bottom of the data dependence graph.

17. The system of claim 13, wherein the scheduler is further configured to assign a common one of the registers to two or more of the plurality of instruction lineages.

18. The system of claim 13, wherein the scheduler is further configured to if a first one of the instructions from a first one of the plurality of instruction lineages shares a common one of the registers with a second one of the instructions from a second one of the instruction lineages and if the first instruction is prior to the second instruction in an instruction order, delay the scheduling of the second instruction until the first instruction is finished using the common register.

* * * * *